United States Patent [19]
Morita

[11] Patent Number: 5,913,420
[45] Date of Patent: *Jun. 22, 1999

[54] MAGNETIC TAPE CARTRIDGE STORAGE CASE

[75] Inventor: Kiyoo Morita, Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/759,379

[22] Filed: Dec. 4, 1996

[30] Foreign Application Priority Data

Dec. 7, 1995 [JP] Japan .................................. 7-319094

[51] Int. Cl.⁶ .................................................. B65D 85/30
[52] U.S. Cl. ..................... 206/308.3; 206/493; 206/387.1
[58] Field of Search ............................... 206/308.1, 308.3, 206/310, 312, 493, 387.1, 408; 360/134

[56] References Cited

U.S. PATENT DOCUMENTS

| | | | |
|---|---|---|---|
| 3,692,956 | 9/1972 | Northrup | 242/343 |
| 4,084,690 | 4/1978 | Pulse | 206/310 |
| 4,122,945 | 10/1978 | Borzak | 206/493 |
| 4,211,337 | 7/1980 | Weavers et al. | 206/387.1 |
| 4,709,813 | 12/1987 | Wildt | 206/308.1 |
| 4,719,529 | 1/1988 | Oishi et al. | 242/343.2 |
| 5,209,351 | 5/1993 | Schoettle et al. | 206/387.1 |
| 5,297,754 | 3/1994 | Albrecht et al. | 242/343 |
| 5,377,825 | 1/1995 | Sykes et al. | 206/310 |

*Primary Examiner*—Paul T. Sewell
*Assistant Examiner*—Nhan T. Lam
*Attorney, Agent, or Firm*—McAulay Nissen Goldberg Kiel & Hand, LLP

[57] ABSTRACT

In a cartridge storage structure for a magnetic tape, a storage case main body includes a bottom member and side wall members which are projected on the bottom member, the bottom member and side wall members forming a case storage space. A closure member includes a top member which covers a top of the storage case main body and closure side members which are projected on the top member and overlapped by the side wall members. A joining device has a hinge for joining the closure member and the storage case main body which are opened and closed freely. A magnetic tape cartridge is stored in the case storage space and includes a cartridge case having a cartridge case bottom and an opening formed on the cartridge case bottom, and a tape reel arranged rotatably inside the cartridge case via the opening, the tape reel having a driving toothed engagement portion which is formed on a bottom of the tape reel. The storage case main body includes a lock member projected on the bottom member, the lock member being engagable with the driving toothed engagement portion for blocking a displacement of the tape reel with respect to the cartridge case.

2 Claims, 6 Drawing Sheets

MAGNETIC TAPE CARTRIDGE STORAGE CASE

BACKGROUND OF THE INVENTION

The present invention relates to a magnetic tape cartridge storage case in which the storage case main body and a closure member which covers the top of the storage case main body are opened and closed freely by a hinge joint for storing a magnetic tape cartridge.

Conventionally, various types of magnetic tape cartridges have been used as recording media for such as computers, and some of such magnetic tape cartridges store single tape reels so as to be rotatable inside the cartridge case with a magnetic tape wound around each of the tape reels.

As shown in FIG. 6, a magnetic tape cartridge 100 includes an upper cartridge 102 and a lower cartridge 103 which form a cartridge case 101 of an approximately square plane shape, and a single tape reel 104 around which a magnetic tape is wound. A toothed portion 106a of a brake button 106 engages with the tape reel 104 by an applied force of a brake spring 105 and the brake button 106 is locked to a projection 102a of the upper cartridge 102 so as not to rotate. Therefore, in this state where the magnetic tape will be neither loosened nor pulled out unexpectedly, accidents caused by the tape slack can be prevented from happening.

When the magnetic tape cartridge 100 is loaded on a recording and playback apparatus of such as a computer, while a driving member of the recording and playback apparatus (not shown), engages with a driving toothed engagement portion 104a of the tape reel 104, the engagement of the brake button 106 and the tape reel 104 is disengaged when a pressing projection of the driving member pushes the brake button 106 upward against the applied force of the brake spring 105. Thus, the magnetic tape can be pulled out-of the tape reel 104 or wound around the tape reel 104 by rotating the tape reel 104 forward or reverse with the driving member. In this case, a metal plate 104b provided inside an annular driving toothed engagement portion 104a is attracted to a magnet on the driving member side to engage the driving member with the driving toothed engagement portion 104a securely.

Although the magnetic tape cartridge storage case 100 which stores the magnetic tape cartridge as described above can be formed in various modes, an instance discussed here may be a storage case where the storage case main body, the closure member and the joining device for attaching the closure member to the storage case main body so as to be opened and closed freely are molded integrally out of material such as synthetic resin.

For the storing of the magnetic tape cartridge inside such storage case as described above, the storage case main body and the closure member are kept open widely first and then the magnetic tape cartridge 100 is placed inside the case storage space of the storage case main body. In this case, the magnetic tape cartridge 100 is located in the case storage space in such a manner that the surrounding wall member of the cartridge case 101 is enclosed inside the side wall members of the storage case main body. Then, the closure member is closed to store the magnetic tape cartridge 100 inside the storage case.

When the magnetic tape cartridge 100 is stored in such a storage case as described above, it is preferable that the magnetic tape cartridge 100 will not move loosely inside the storage case. For preventing such loose movements, it is conceivable to reduce the clearance between the surrounding wall member the cartridge case 101 and the side wall members of the storage case main body which encloses the surrounding wall member.

Although the reduction of clearance is effective in controlling the loose movements of the cartridge case 101 inside the storage case, it is ineffective in controlling the loose movements of the tape reel 104 which is stored inside the cartridge case 101. This causes such problems as powder dust generated by abrasion of the tape reel 104 against the cartridge case 101 and wrinkles on the magnetic tape.

SUMMARY OF THE INVENTION

An object of the present invention relates to a resolution of the conventional problem and provides an improved magnetic tape cartridge storage case which successfully controls the loose movements of the tape reel of the stored magnetic tape cartridge.

The above-described object of the present invention is achieved by a cartridge storage structure for a magnetic tape, which includes: a storage case main body including a bottom member and side wall members which are projected on the bottom member, the bottom member and side wall members forming a case storage space; a closure member including a top member which covers a top of the storage case main body and closure side members which are projected on the top member and overlapped by the side wall members; a joining device having a hinge for joining the closure member and the storage case main body which are opened and closed freely; and a magnetic tape cartridge stored in the case storage space and including a cartridge case having a cartridge case bottom and an opening formed on the cartridge case bottom, and a tape reel arranged rotatably inside the cartridge case via the opening, the tape reel having a driving toothed engagement portion which is formed on a bottom of the tape reel, in which the storage case main body includes a lock device projected on the bottom member, the lock device being engagable with the driving toothed engagement portion for blocking a displacement of the tape reel with respect to the cartridge case.

Preferably, the lock device includes an annular toothed portion which is provided with a shape matching to the driving toothed engagement portion formed on the bottom of the tape reel so as to block the displacement of the tape reel when fitted to the driving toothed engagement portion.

More preferably the lock device is formed of an elastic material member such as a rubber member or a sponge member so as to block the displacement of the tape reel when pressed to make a contact with the driving toothed engagement portion.

DETAILED DESCRIPTION OF THE PREFERRED EMBODIMENTS

With reference to the attached drawings, embodiments of the magnetic tape cartridge storage case according to the present invention are described in detail.

Figure 1:
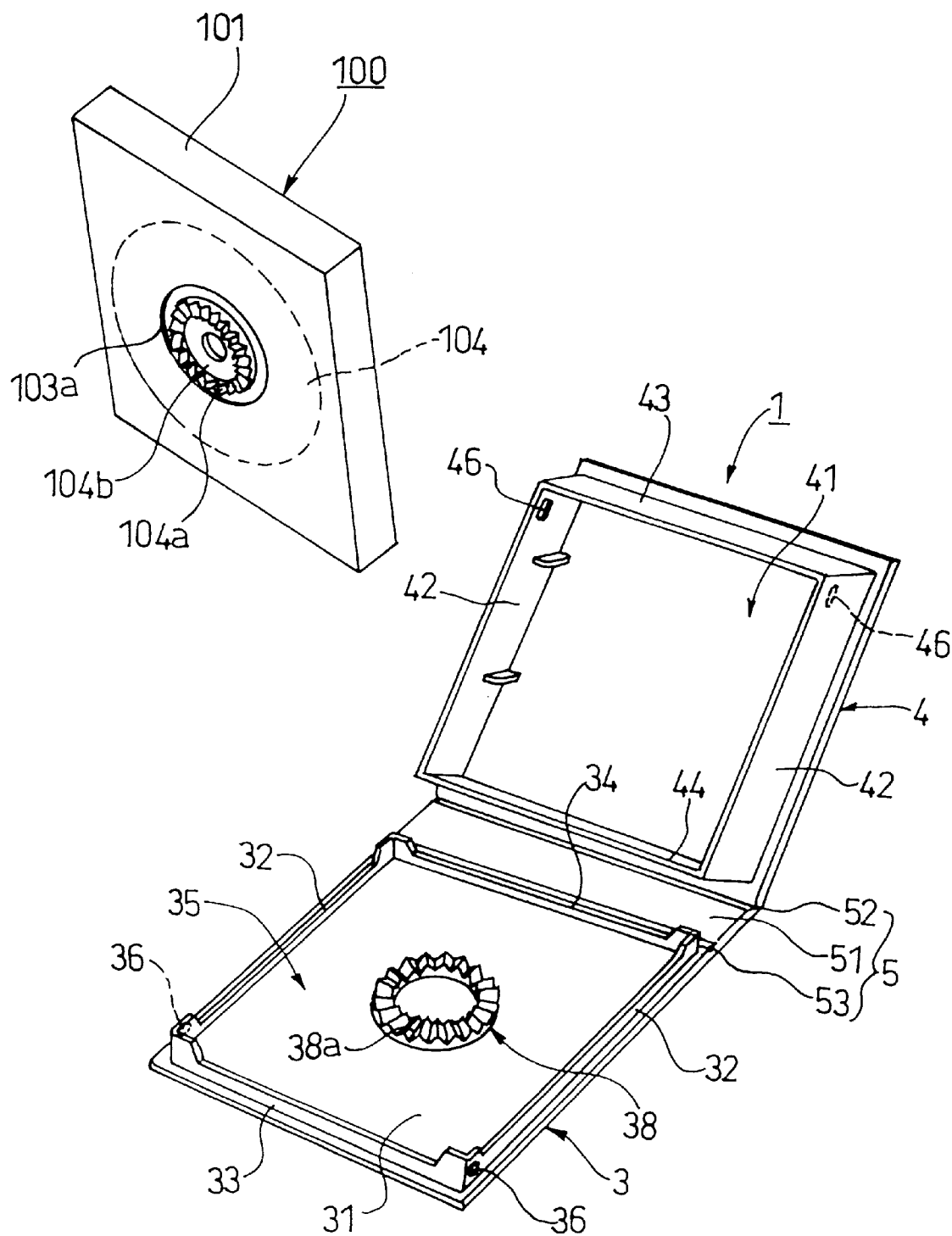
FIG. 1 is an entire perspective view of the first embodiment of the magnetic tape cartridge storage case according to the present invention.
Figure 6:
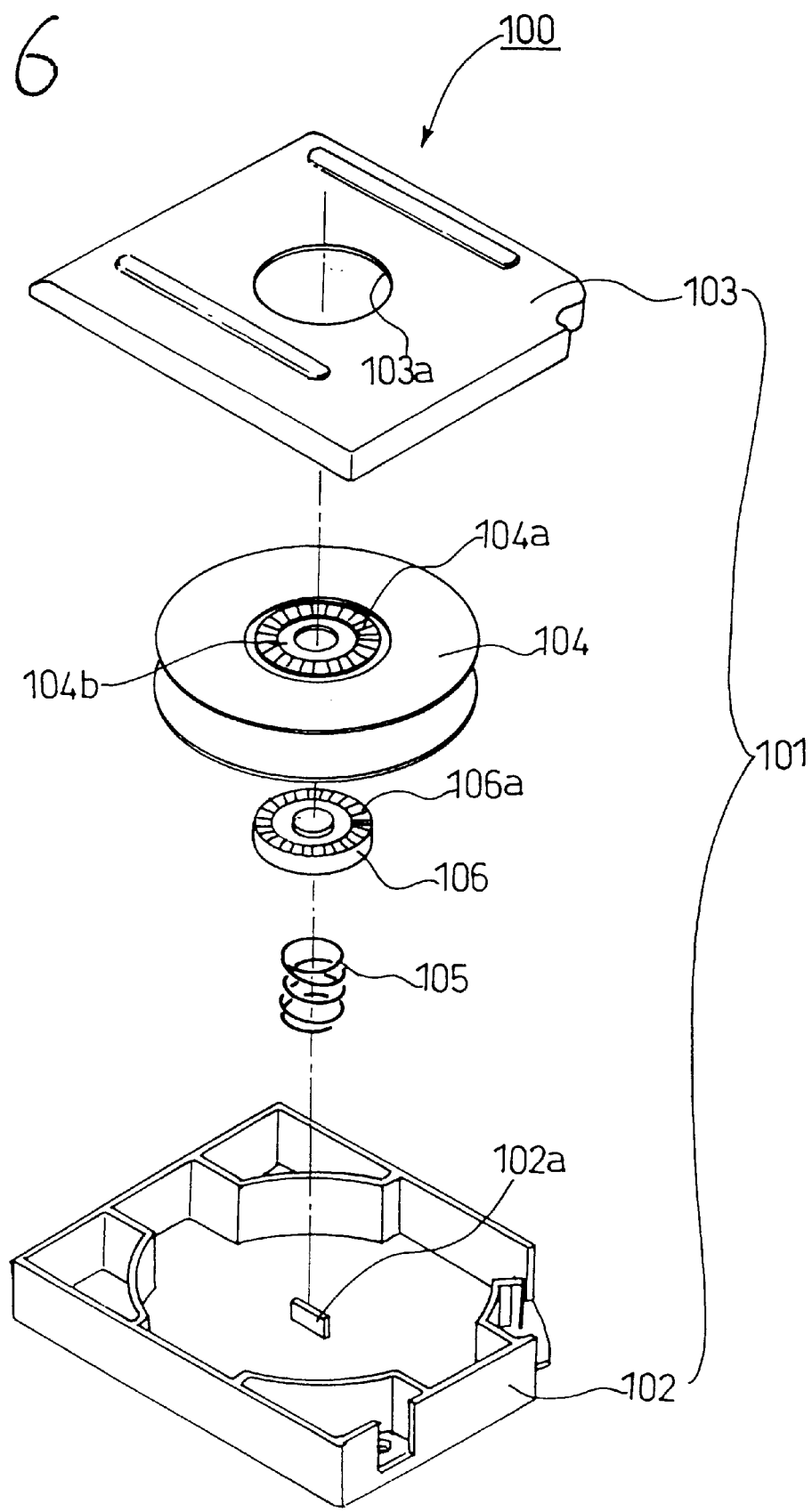
FIG. 6 is a disassembled perspective view showing the magnetic tape cartridge having a single tape reel.

As shown in FIG. 1, the magnetic tape cartridge storage case 1 stores the magnetic tape cartridge 100 shown in FIG. 6, where a storage case main body 3, a closure member 4 and a joining device 5 which joins the closure member 4 and the storage case main body 3 so as to be opened and closed freely are molded integrally out of material such as synthetic resin.

The storage case main body 3 is provided with a case storage space 35 which is open upward and enclosed by a bottom member 31, side wall members 32 which are projected on both side edges of the bottom member 31, a front wall member 33 which is projected on the front edge of the bottom member 31, and a rear wall member 34 which is projected on the rear edge of the bottom member 31. The case storage space 35 is formed to be large enough to insert the magnetic tape cartridge 100.

In the center of the bottom member 31, an annular toothed portion 38 which is the lock device to block the tape reel 104 of the stored magnetic tape cartridge 100 from moving is molded integrally, and the annular toothed portion 38 includes a plurality of teeth 38a formed annularly and successively. The annular toothed portion 38 is provided with a shape which matches the opening position of an opening 103a formed in the lower cartridge 103 of the magnetic tape cartridge 100 and fits the driving toothed engagement portion 104a of the tape reel 104.

The closure member 4 includes a top member 41 which covers the upper portion of the storage case main body 3, side wall members 42 which are projected on both side edges of the top member 41 and folded over the side wall members 32 of the storage case main body 3, a front wall member 43 which is projected on the front edge of the top member 41 and folded over the front wall member 33 of the storage case main body 3, and a rear wall member 44 which is projected on the rear edge of the top member 41 and folded-over the rear wall member 34 of the storage case main body 3.

The joining device 5 joins the bottom edge of a joining plate 51 to the rear edge of the bottom member 31 of the storage case main body 3 and the top edge of the joining plate 51 to the rear edge of the top member 41 of the closure member 4. Both the top and bottom edges of the joining plate 51 are made thinner so as to function as hinges 52 and 53. That is, the joining device 5 is joined to the rear edge of the bottom member 31 by the bottom edge of the joining plate 51 and also joined to the rear edge of the top member 41 by the top edge of the joining plate 51.

Figure 2:
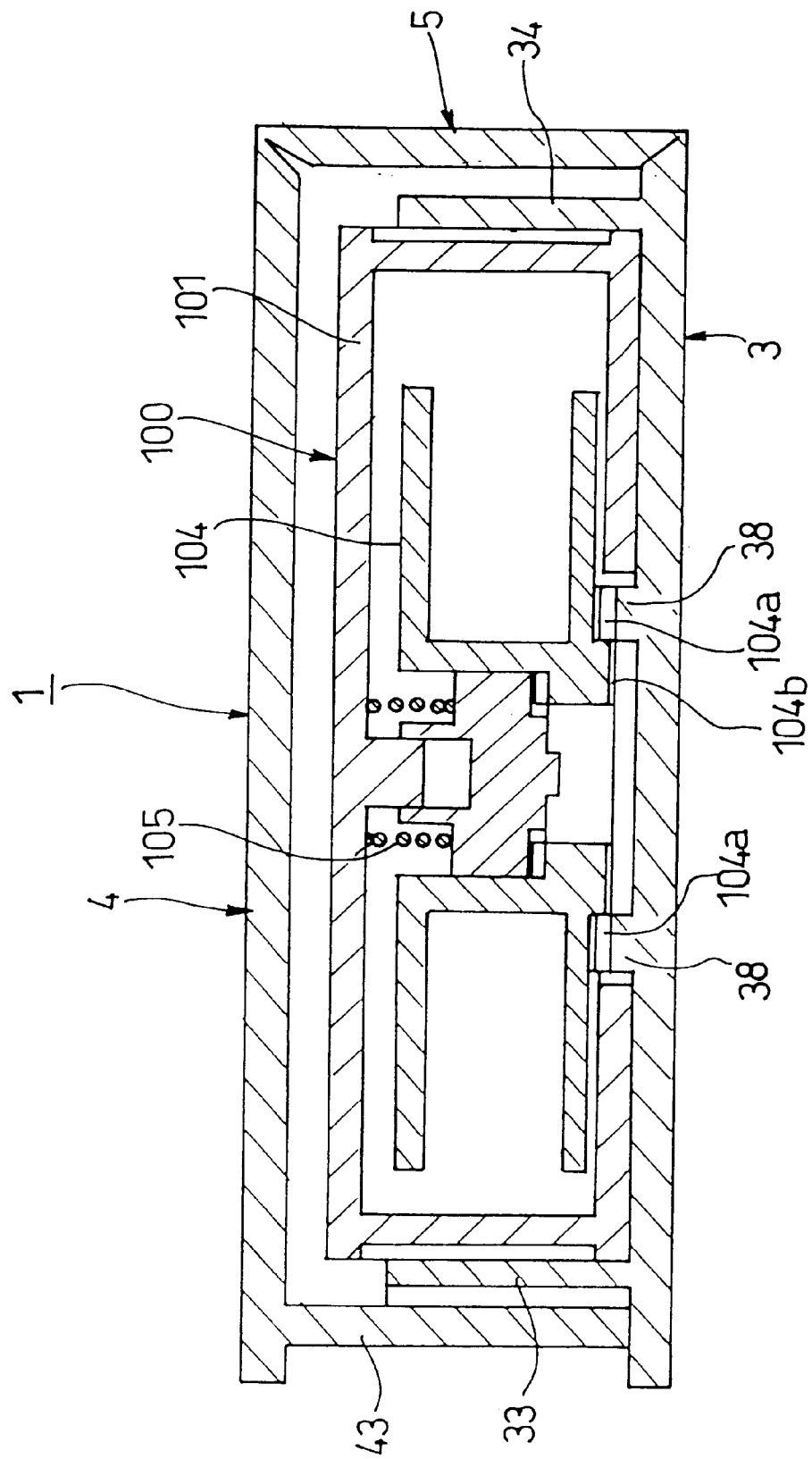
FIG. 2 is a sectional view showing a state where the magnetic tape cartridge is stored inside the magnetic tape cartridge storage case shown in FIG. 1.

When the storage case main body 3 and the closure member 4 are opened wide to insert the magnetic tape cartridge 100 into the case storage space 35 of the storage case main body 3 as shown in FIG. 1, the annular toothed portion 38 projecting from the bottom member 31 of the storage case main body 3 fits the driving toothed engagement portion 104a of the tape reel 104 located on the bottom surface of the magnetic tape cartridge 100 and blocks the displacement of the tape reel 104 with respect to the bottom member 31 as shown in FIG. 2.

The surrounding wall portion of the cartridge case 101 of the magnetic tape cartridge 100 is positioned inside the case storage space 35 by the side wall members 32, the front wall member 33 and the rear wall member 34 of the storage case main body 3.

When the closure member 4 is closed in this state, the magnetic tape cartridge 100 can be stored securely inside the magnetic tape cartridge storage case 1 so that the tape reel 104 and the cartridge case 101 will not move loosely.

As shown in FIG. 1, engagement projections 46 which engage with the lock grooves 36 formed on the side wall members 32 of the storage case main body 3 when the closure member 4 is closed are formed on the inner surfaces of the side wall members 42 of the closure member 4, and the state where the closure member 4 is closed is maintained by the engagement of the lock grooves 36 and the engagement projections 46.

Although the displacement of the tape reel 104 in the magnetic tape cartridge storage case 1 according to the first embodiment described above is prevented by fitting the annular toothed portion 38 formed on the bottom member 31 to the driving toothed engagement portion 104a of the tape reel 104, the present invention is not limited to this and it is possible with the elastic material member such as a rubber member or a sponge member glued on or fastened otherwise to the bottom member 31 of the magnetic tape cartridge storage case 1 so as to protrude in order to prevent the loose movements of the tape reel 104 by pressing the elastic material member to the driving toothed engagement portion 104a of the tape reel 104.

The magnetic tape cartridge stored in the magnetic tape cartridge storage case in the above-described first embodiment is the magnetic tape cartridge 100 which stores a single tape reel 104 inside the cartridge case 101 but, not limited to this, it is also possible to provide a magnetic tape cartridge storage case which can store a magnetic tape cartridge where a pair of tape reels are stacked in two layers inside the cartridge case. Such two-layer stack of the pair of tapes inside the cartridge case enables expansion of memory capacity of the magnetic tape cartridge without unnecessary increase in the size of the cartridge case.

Figure 3:
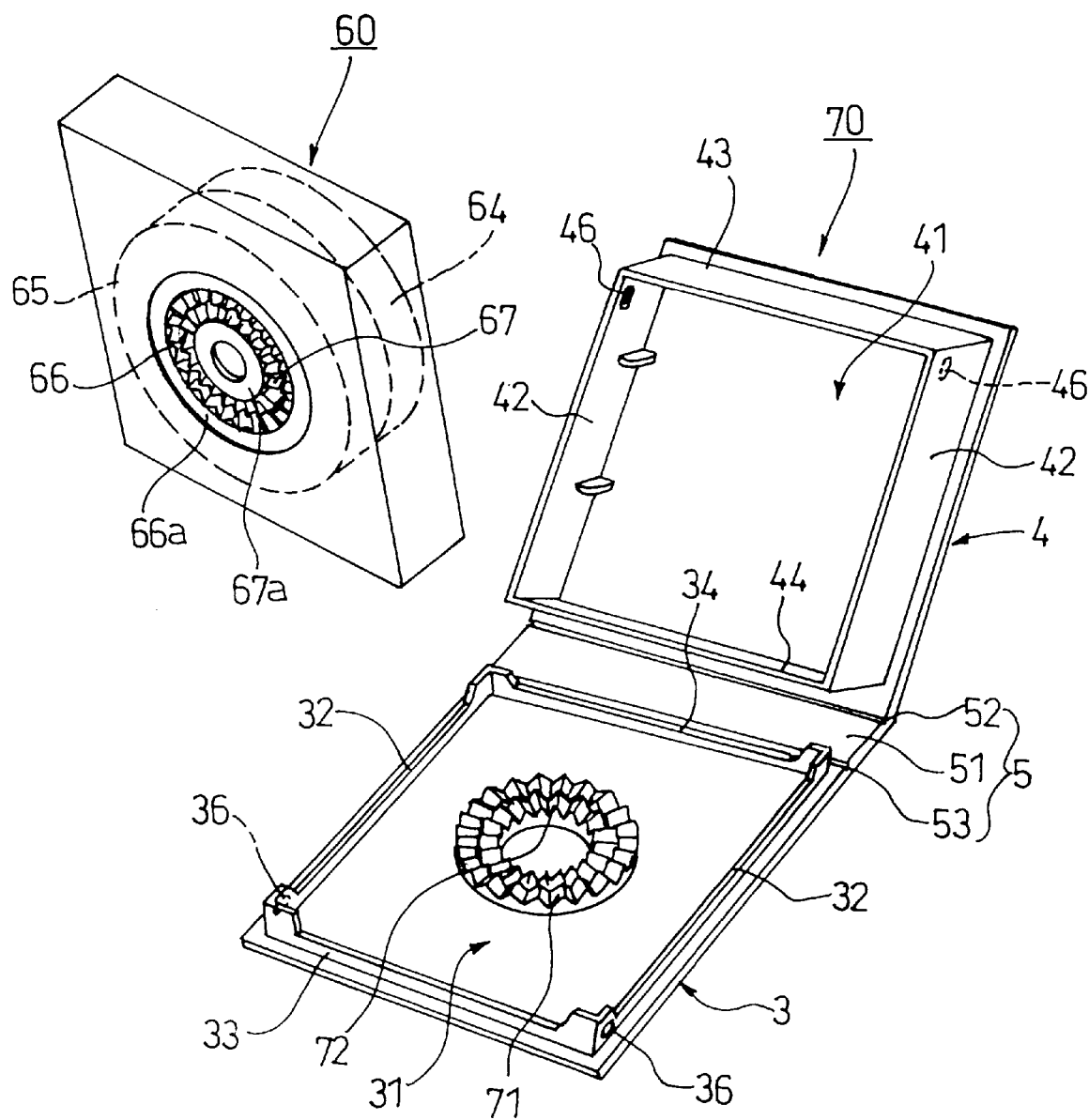
FIG. 3 is an entire perspective view showing the second embodiment of the magnetic tape cartridge storage case according to the present invention.

Next, a magnetic tape cartridge storage case according to the second embodiment of the present invention is described with reference to FIGS. 3 through 5, in which the cartridge storage case stores the magnetic tape cartridge with a pair of tape reels stacked in two layers inside the cartridge case. The same or similar members as in the above-described first embodiment are expressed with the same symbols and the detailed descriptions are eliminated.

Figure 4:
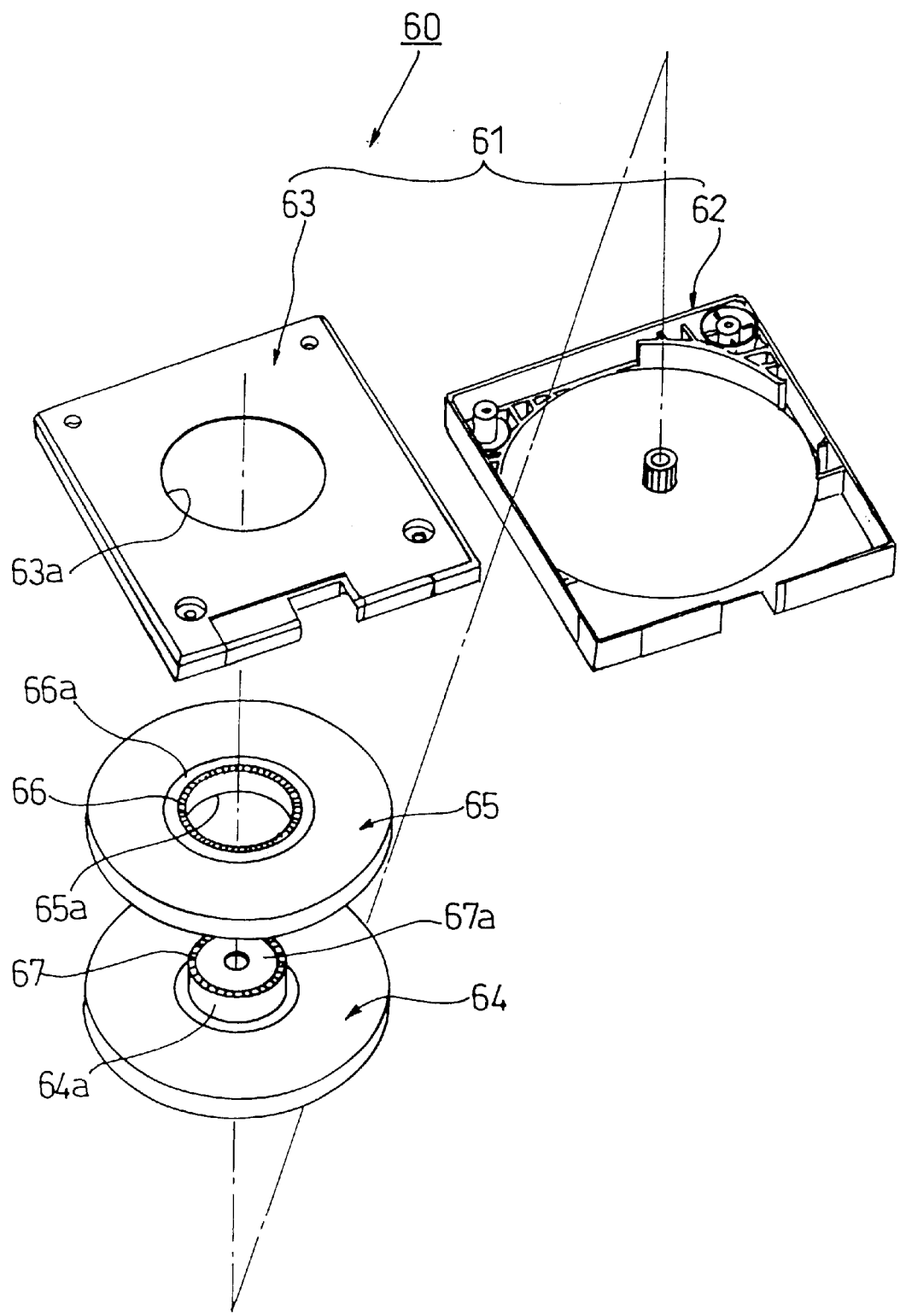
FIG. 4 is a disassembled perspective view showing the magnetic tape cartridge where a pair of tape reels are stacked in two layers.

As shown in FIG. 4, a magnetic tape cartridge 60 includes an upper cartridge 62 and a lower cartridge 63, which constitute a cartridge case 61 of an approximately square plane shape, and an upper tape reel 64 and a lower tape reel 65 around which a magnetic tape is respectively wound. An opening 65a is formed in the center of the lower tape reel 65 and a driving toothed engagement-portion 66 is formed along the rim of the opening 65a in the bottom of the lower tape reel 65.

A boss portion 64a protrudes from the center of the bottom surface of the upper tape reel 64, and the boss portion 64a has such a height as enough to make its top surface flush with the bottom surface of the lower tape reel 65 when inserted into the opening 65a of the lower tape reel 65. Furthermore, a driving toothed engagement portion 67 is formed along the rim of the top surface of the boss portion 64a.

Figure 5:
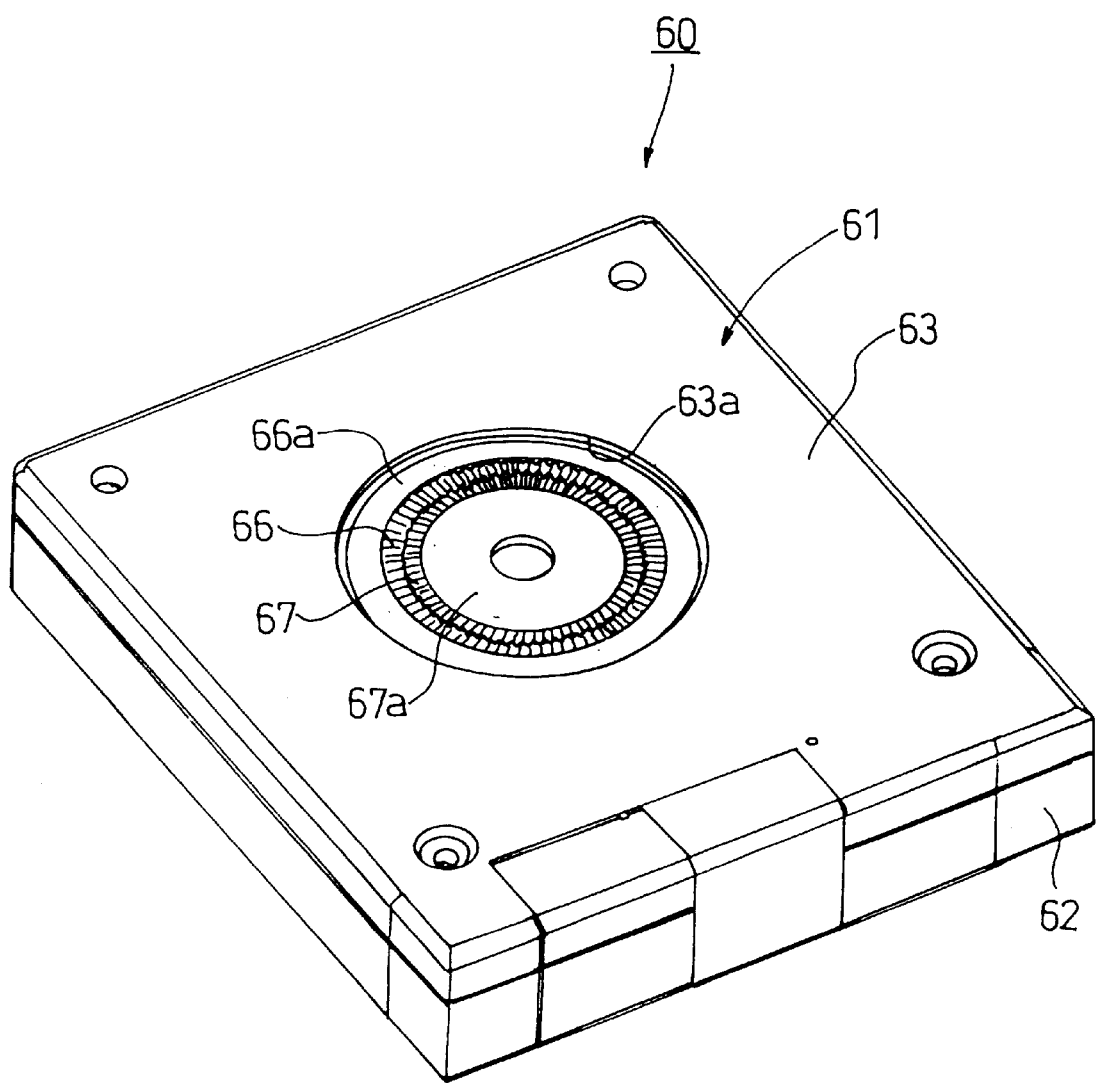
FIG. 5 is a perspective view showing the back of the magnetic tape cartridge shown in FIG. 4.

As shown in FIG. 5, the driving toothed engagement portion 67 is positioned so as to be flush with the driving toothed engagement portion 66 inside the driving toothed engagement portion 66 of the lower tape reel 65 when the upper tape reel 64 and the lower tape reel 65 are stored inside the cartridge case 61.

The above-described upper and lower tape reels 64 and 65 are made not to rotate by a lock device (not shown) before the magnetic tape cartridge 60 is in use for prevention of the tape slack. When the magnetic tape cartridge 60 is loaded on a recording and playback apparatus, such as a computer, driver elements of the recording and playback apparatus disengage the engagements of the upper and lower tape reels 64 and 65 and the lock device to make the upper and lower tape reels 64 and 65 free for rotations.

A metal plate 67a and a metal plate 66a are provided respectively on the surfaces of the upper tape reel 64 and the lower tape reel 65 and, when the magnetic tape cartridge 60 is loaded on the recording and playback apparatus, such as a computer, the driver elements of the recording and playback apparatus respectively engage with driving toothed engagement portions 66 and 67; simultaneously, the metal plates 66a and 67a are respectively attracted to the magnets on the side of the driver elements the driver elements and the driving toothed engagement portions 66 and 67 are securely engaged respectively.

A magnetic tape cartridge storage case 70 which stores the magnetic tape cartridge 60 which includes the above-described upper and lower tape reels 64 and 65 is formed almost the same as is the magnetic tape cartridge storage case 1 of the first embodiment shown in FIG. 1 except that the lock device for preventing the displacement of the tape reels 64 and 65 of the stored magnetic tape cartridge 60 is formed of a double ring of an outer annular toothed portion 71 and an inner annular toothed portion 72.

That is, the outer and inner annular toothed portions 71 and 72 of the magnetic tape cartridge storage case 70 are molded integrally in the center of the bottom member 31; the outer annular toothed portion 71 has a toothed shape which can be fitted to the driving toothed engagement portion 66 of the lower tape reel 65 positioned on the bottom of the magnetic tape cartridge 60 and the inner annular toothed portion 72 has a toothed shape which can be fitted to the driving toothed engagement portion 67 of the upper tape reel 64. Therefore, when he magnetic tape cartridge 60 is placed in the case storage space 35, via an opening 63a of the lower cartridge 63, the driving toothed engagement portion 66 of the lower tape reel 65 fits the outer annular toothed portion 71 and the driving toothed engagement portion 67 of the upper tape reel 64 fits the inner annular toothed portion 72. When the magnetic tape cartridge 60 is stored inside the magnetic tape cartridge storage case 70, the displacement-of the upper tape reel 64 and the lower tape reel 65 with respect to the bottom member 31 is thus blocked and the loose movements are prevented.

Although the loose movements of the upper tape reel 64 and the lower tape reel 65 are prevented by fitting the double ring of the outer annular toothed portion 71 and the inner annular toothed portion 72, which are formed on the bottom member 31, respectively to the driving toothed engagement portion 66 of the lower tape reel 65 and the driving toothed engagement portion 67 of the upper tape reel 64 in the magnetic tape cartridge storage case 70 of the second embodiment described above, if the numbers of teeth of the driving toothed engagement portions 66 and 67 are the same, an annular toothed portion of a wide width may be formed on the bottom member 31 of the magnetic tape cartridge storage case 70 and the loose movements of the upper and lower tape reels 64 and 65 can be prevented by fitting this annular toothed portion simultaneously to the driving toothed engagement portions 66 and 67.

In place of the above-described wide annular toothed portion as shown in FIG. 1a, an elastic material member 37 such as a rubber member or a sponge member may be provided as the lock device, where the loose movements of the upper and lower tape reels 64 and 65 can be prevented by pressing this elastic material member to the driving toothed engagement portion 66 of the lower tape reel 65 and the driving toothed engagement portion 67 of the upper tape reel 64.

As described above, in the magnetic tape cartridge storage case according to the present invention, the lock device protruding from the bottom member of the magnetic tape cartridge storage case engages with a driving toothed engagement portion formed on the bottom of the tape reel, which is arranged rotatably inside the cartridge case, via the opening formed on the cartridge case bottom-of the magnetic tape cartridge.

With the magnetic tape cartridge stored in the magnetic tape cartridge storage case, the surrounding wall member of the cartridge case is positioned by the side wall member, the front wall member and the rear wall member of the storage case main body. Further, the displacement of the tape reel with respect to the bottom member of the storage case main body is blocked. Therefore, the loose movements of the magnetic tape cartridge is prevented.

Accordingly, the improved tape cartridge storage case can be provided where both the cartridge case and the tape reel stored in the magnetic tape cartridge are prevented from moving loosely.

What is claimed is:

1. A cartridge storage structure for a magnetic tape, comprising:

a storage case main body including a bottom member and side wall members which are projected on the bottom member, the bottom member and side wall members forming a case storage space;

a closure member including a top member which covers a top of the storage case main body and closure side members which are projected on the top member and overlapped by the side wall members;

a joining device having a hinge for joining the closure member and the storage case main body which are opened and closed freely; and a magnetic tape cartridge stored in the case storage space and including a cartridge case having a cartridge case bottom and an opening formed on the cartridge case bottom, and a tape reel arranged rotatably inside the cartridge case via the opening, the tape reel having a driving toothed engagement portion which is formed on a bottom of the tape reel;

wherein the storage case main body includes a lock device projected on the bottom member, the lock device being engageable with the driving toothed engagement portion in the projected direction of the lock device for blocking a displacement of the tape reel with respect to the cartridge case, and wherein the lock device includes an annular toothed portion having a shape matching the driving toothed engagement portion.

2. A cartridge storage structure for a magnetic tape, comprising:

a storage case main body including a bottom member and side wall members which are projected on the bottom member, the bottom member and side wall members forming a case storage space;

a closure member including a top member which covers a top of the storage case main body and closure side members which are projected on the top member and overlapped by the side wall members;

a joining device having a hinge for joining the closure member and the storage case main body which are opened and closed freely; and a magnetic tape cartridge stored in the case storage space and including a cartridge case having a cartridge case bottom and an opening formed on the cartridge case bottom, and a tape reel arranged rotatably inside the cartridge case via the opening, the tape reel having a driving toothed engagement portion which is formed on a bottom of the tape reel;

wherein the storage case main body includes a lock device projected on the bottom member, the lock device being engageable with the driving toothed engagement portion in the projected direction of the lock device for blocking a displacement of the tape reel with respect to the cartridge case; and wherein the lock device includes a portion that engages the driving toothed engagement portion and when engaged conforms with the teeth of said driving toothed engagement portion.

\* \* \* \* \*